United States Patent [19]

Kemmerling

[11] 4,213,235
[45] Jul. 22, 1980

[54] SEAL REMOVER
[76] Inventor: Gary Kemmerling, 7165 Fillmore Rd., Mentor, Ohio 44060
[21] Appl. No.: 951,023
[22] Filed: Oct. 13, 1978
[51] Int. Cl.² ............................................ B23P 19/02
[52] U.S. Cl. .................................................. 29/235
[58] Field of Search ................ 29/235; 81/8.1; 277/1, 277/9.5; 408/72 R

[56] References Cited
U.S. PATENT DOCUMENTS

| | | | |
|---|---|---|---|
| 1,916,414 | 7/1933 | Chapman | 408/72 |
| 2,419,223 | 4/1947 | Mettrick et al. | 408/79 |
| 2,942,500 | 6/1960 | Conner | 408/72 B |
| 3,564,696 | 2/1971 | Shepanski | 29/235 |

FOREIGN PATENT DOCUMENTS 1156627  10/1963  Fed. Rep. of Germany ............. 408/72

*Primary Examiner*—James L. Jones, Jr.
*Attorney, Agent, or Firm*—Watts, Hoffman, Fisher & Heinke, Co.

[57] ABSTRACT

A tool for use in the removing of annular seals surrounding a shaft extending from a mechanism. The tool attaches to the mechanism and serves as a guide for a drill used to drill into the seal. The tool includes a portion which engages the end of the extending shaft, peripherally spaced longitudinal drill guide holes and a means locking the tool to the shaft.

4 Claims, 5 Drawing Figures

SEAL REMOVER

BACKGROUND OF THE INVENTION

The present invention relates generally to a drill guide apparatus for use in removing annular oil seals surrounding a shaft extending from a mechanism, and more particularly, relates to a drill guide apparatus for removing pitman shaft seals from automotive power steering units.

Present-day power steering units have composite resilient seals surrounding the output shaft, or what is more commonly referred to as the pitman shaft. The replacement of these seals can be time consuming and expensive.

One current and somewhat inefficient method of removing the seals involves manually prying the seal assembly from the housing with a pointed tool such as a screw driver. This method often causes damage to one or more steering unit components. This method becomes especially difficult when it is attempted upon a power steering unit mounted on a vehicle.

Another method of removing the seal has been the practice of using a sleeve-like installation tool to drive the seal assembly into the steering housing. The tool is placed against the exposed radial surface of the outer seal and then struck with a hammer to drive the seal assembly into the housing. As in the prior method, damage to shaft, housing and/or shaft bearing may often result.

Tools adapted to extracting annular oil seals surrounding shafts other than pitman shafts have been suggested by prior patents. In particular, puller type tools have been proposed for removing engine crankshaft oil seals. Typically, these tools, as illustrated in U.S. Pat. No. 3,564,696 and 3,909,916, generally employ threaded members to engage the face of the seal in one or more locations and a screw member coacting with the tool and the end of the crankshaft or the housing surface to pull or withdraw the seal from within the housing.

This type of tool is not suitable for removing the oil seals from a power steering unit. Crankshaft oil seals are generally larger in diameter and the crankshaft itself extends only a short distance beyond the surface of the housing. The tools suggested by the prior patents could easily accommodate typical crankshaft and housing dimensions and configurations. In a power steering unit, the pitman shaft generally extends well beyond the housing and more importantly is of a diameter much smaller than that of a crankshaft. Additionally, the pitman shaft seal is a composite seal comprising multiple seals and metal spacing discs whereas the crankshaft seal is generally a single component. It would be difficult if not impossible to engage and extract the components of a power steering seal by a tool constructed in accordance with the prior patents.

Attempts have been made to manually drill out the oil seals, usually with little success. In many cases, misalignment and chattering of the drill precluded the removal of the seal and at times caused damage to one or more steering unit components.

SUMMARY OF THE INVENTION

The disadvantages associated with the prior methods are overcome with the present invention. The invention comprises a drill guide apparatus to be used in conjunction with a drill. The apparatus attaches to a mechanism from which an oil seal is to be removed, e.g., a steering unit having an extending shaft. The apparatus provides a guide for the drill to maintain its alignment with the oil seal, as the seal is being drilled into.

The apparatus of the present invention includes a body having a centrally disposed bore. The body has two portions, one portion for coacting with and engaging the end contour of the extending shaft and a second portion for providing clearance for a non-engaged portion of the shaft. It also includes set screws for locking the body to the shaft. The body further includes at least one drill guide hole disposed parallel to the axis of the central bore and located between the central bore and the outer wall of the body.

In a preferred embodiment, the portion of the body that engages the end of the shaft is threaded and is adapted to engage the threaded end portion of a pitman shaft extending from a power steering housing. The body is generally cylindrical in shape and its axial length is chosen so the body abuts the housing surface concentric with the shaft opening, when it is threadedly engaged with the end of the shaft. It further includes two or more peripherally displaced drill guide holes to facilitate drilling into the seal assembly at multiple locations without removing or repositioning the apparatus.

The present invention, then, provides a novel tool for use in the removing of the oil seals surrounding a shaft by providing an alignment means for a drilling operation. In so doing, it simplifies and expedites the removal of these seals in an inexpensive and uncomplicated matter.

In particular, this invention provides an apparatus for use in the removing of annular oil seals surrounding the pitman shaft of an automotive steering unit.

More specifically this invention provides a drill guide apparatus that can be easily attached to a power steering unit and provide a guide for drilling into the oil seals surrounding the pitman shaft.

The above and other features and advantages of the present invention will become more apparent from the following description.

BRIEF DESCRIPTION OF DRAWINGS

In the drawings forming part of this application.

DESCRIPTION OF THE PREFERRED EMBODIMENT

Figure 1:
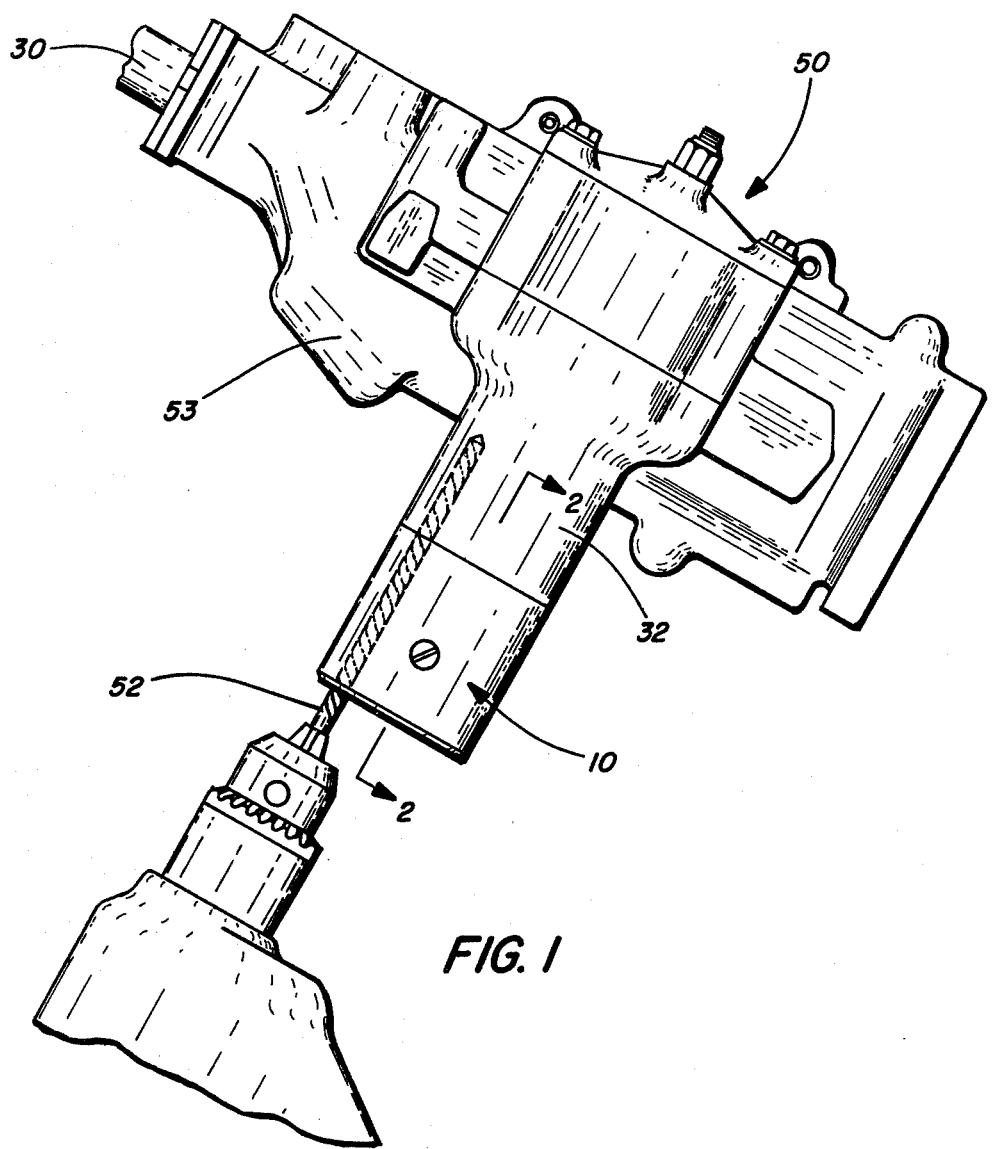
FIG. 1 is an elevational view of the invention shown attached to a power steering unit and further shown with a drill inserted therein.

In FIG. 1, a drill guide apparatus 10 of this invention is shown attached to a power steering unit 50. A drill 52 is shown inserted into the drill guide, and is further shown extending into a housing 53 of the power steering unit.

The power steering unit as shown in FIG. 1, includes an input shaft 30 which is coupled to a steering wheel (not shown). Rotation of the input shaft causes rotation in an output shaft 40 (shown in FIG. 2), more commonly referred to as a pitman shaft. The pitman shaft extends from a power steering housing portion 32 and is rotatably supported by an internal bearing 34. A pitman seal, located adjacent the bearing, surrounds the shaft and prevents a loss of power steering fluid from the housing.

Figure 2:
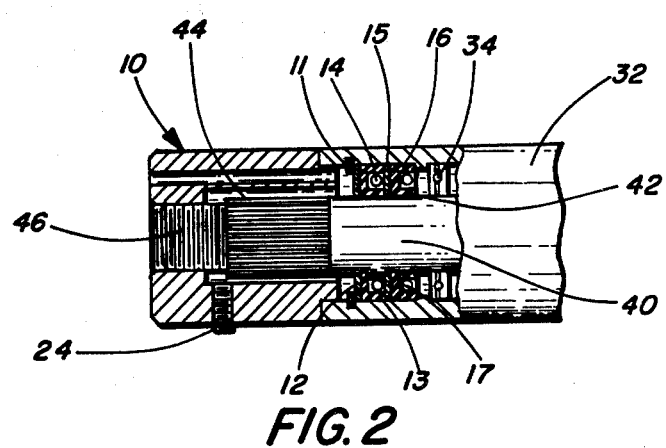
FIG. 2 is a cross-sectional view of the invention attached to the power steering unit, the FIGURE further showing a portion of the power steering unit in which the annular seals are located.

In FIG. 2, the components comprising a pitman seal are depicted. The seal includes: a metal disc 12 approximately 1/16th inch thick and ¼ inch in width; an annular U-shaped elastomeric seal 13 with a reinforcing or biasing member 14; another metal disc 15; and, another annular U-shaped elastomeric seal 16 with an associated reinforcing member 17. A metal snap ring 11 retains the seal assembly within the housing portion 32.

The geometry of a typical pitman shaft 40 is shown in FIG. 2. The shaft includes a smooth wall portion 42 which is within the housing portion 32 and in sealing engagement with the pitman seal assembly. The shaft further includes a serrated portion 44, which is outside the housing and in use engages a serrated hole located in a pitman arm (not shown). A threaded portion 46, accommodates a threaded fastener (not shown) which secures the pitman arm to the pitman shaft.

Figure 3:
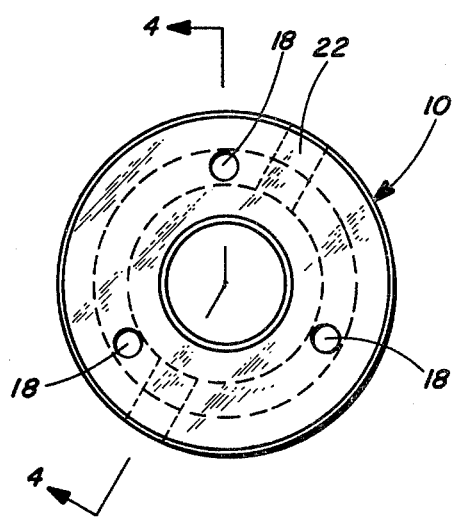
FIG. 3 is a top view of the invention.
Figure 4:
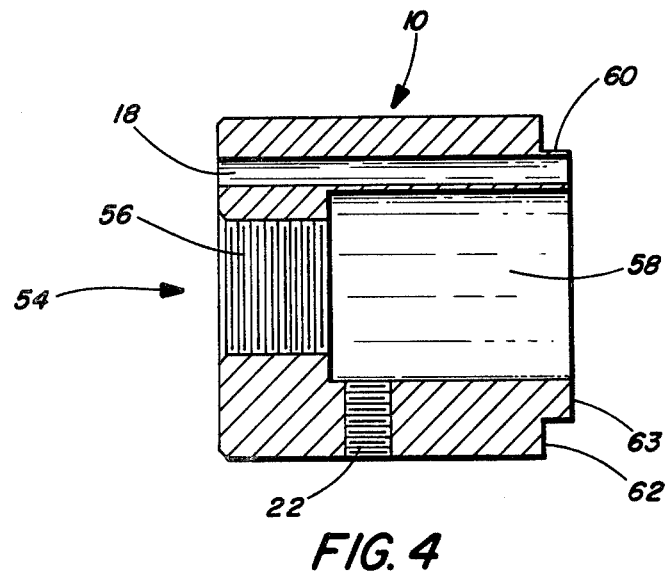
FIG. 4 is a cross-sectional view of the invention taken along the line 4—4.

The drill guide apparatus 10, as shown in FIGS. 1–5 is generally cylindrical in shape. As shown in FIGS. 3 and 4, it includes a central bore 54 having two portions, 56 and 58. The portion 58 is sized to allow clearance for the serrated segment 44 of the pitman shaft. The portion 56 is threaded and is adapted to threadedly engage the threaded end 46 of the pitman shaft.

In the preferred embodiment, three peripherally spaced drill guide holes 18, are disposed parallel to the axis of the central bore 54, between the outer surface and central bore. The drill guide holes are located such that, when the drill guide 10 is mounted to the power steering unit, the drill guide holes 18 will be axially aligned with the pitman shaft and orthogonal to the face of the pitman seal assembly. The diameter of the guide holes is selected to provide adequate clearance for the drill 52. The drill guide holes 18 locate and maintain the perpendicular alignment of the drill 52 with the radial face of the pitman seal, during a drilling operation.

The drill guide includes a reduced diameter portion or end section 60, dimensioned to fit within a bore 55 of the housing portion 32 of the power steering unit through which the shaft 40 extends. When the drill guide 10 is mounted to the power steering unit, the reduced portion 60 will enter the power steering housing bore 55. A shoulder 62 of the drill guide will abut a flat circular housing surface 59 at the end of the housing portion 32.

The drill guide further includes a pair of threaded radial holes 22. Each hole 22 threadedly receives a set screw 24, which engages the pitman shaft to lock the drill guide to the shaft.

The axial length of the drill guide 10 is chosen so that the shoulder 62 will abut the power steering housing when the guide is engaged by the threaded portion of the pitman shaft. Additionally, the reduced diameter portion may be sized so that an end surface 63 will rest against the pitman seal component 12. By sizing the drill guide in this manner, axial as well as radial movements are minimized between the drill guide and the power steering unit, once the drill guide is installed.

To remove a pitman seal utilizing this drill guide, the snap ring 11, which retains the seal assembly within the power steering housing, must first be removed by prying it out with a screw driver or other suitable tool. Once the snap ring is removed, the drill guide 10 is screwed onto the pitman shaft 40 until the shoulder 62 contacts the surface 59 of the power steering housing. The set screws received in the threaded holes 22 are then turned until they engage the pitman shaft, locking the drill guide and preventing relative rotational movement between it and the pitman shaft.

Figure 5:
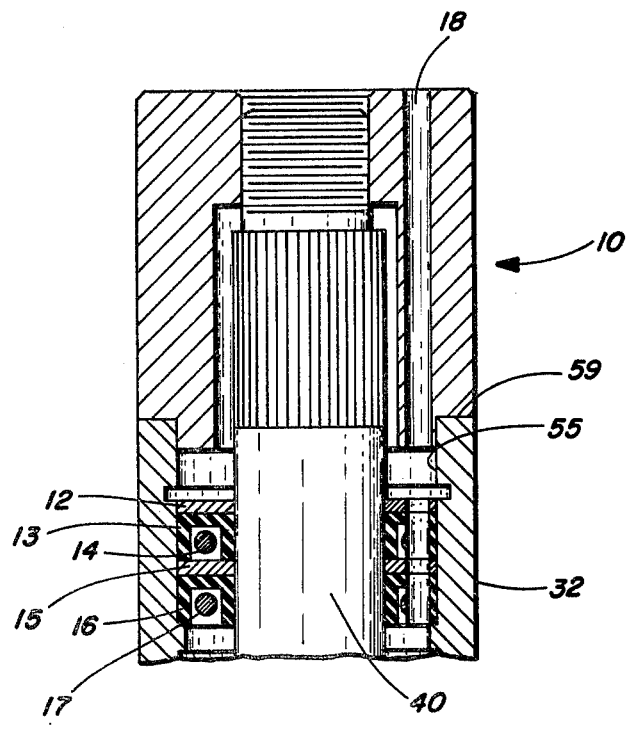
FIG. 5 is a cross-sectional view of the invention and a portion of the power steering unit taken along line 5—5 but with the drill removed.

Once the tool has been secured to the power steering unit, a drill is inserted into a guide hole and is operated to drill through disc 12, seal 13, disc 15 and seal 16. FIG. 5 depicts the result of drilling through one guide hole. The same operation is then performed in the remaining two guide holes. Once this has been accomplished, each set screw is loosened and the tool removed from the pitman shaft. The three holes drilled into the pitman seal will sufficiently weaken the seal structure and allow the individual members to be easily pulled or picked from the housing by a hook or other suitable tool.

It should be apparent from the description of the preferred embodiment, that a novel tool for removing pitman seals from power steering units is provided. The tool is simple in structure and is easily installed on a power steering unit. Once installed, it facilitates drilling into the pitman seal thereby reducing the circumferential engagement of the seal with the inside of the power steering unit bore. After the drilling is complete, the drill guide is removed and the seal then pulled from the power steering unit.

Although the features of this invention have been described with a certain degree of particularity, various changes and modifications can be made to it by those skilled in the art without departing from the spirit and scope of the invention as described and hereinafter claimed.

I claim:

1. An apparatus for use in removing from within a mechanism, annular seals surrounding a shaft extending from said mechanism, the apparatus comprising:
   (a) a body including a central bore therethrough having two portions;
   (b) one of said bore portions for coacting with and engaging the end contour of the shaft, said one portion being threaded and adapted to threadedly engage the end of the extending shaft;
   (c) the second portion of said bore having a diameter larger than the diameter of the first bore portion so that clearance is provided for the non-engaged portions of the extending shaft;
   (d) the body further including a reduced diameter end section adapted to enter the bore of the mechanism from which the shaft extends to minimize relative lateral movement between the apparatus and the mechanisms;
   (e) means for locking said body to said shaft; and,
   (f) at least one drill guide hole disposed longitudinally between the outer wall and the central bore of said body.

2. An apparatus for use in the removing of annular seals surrounding a pitman shaft in a vehicle steering mechanism, the apparatus comprising:
   (a) a body including a central bore therethrough having two portions;
   (b) one of the bore portions being threaded and adapted to threadedly engage the threaded portion of the pitman shaft;

(c) the second bore portion having a diameter larger than the diameter of the first portion so that clearance for the non-engaged portions of the pitman shaft is provided;

(d) the body further including a reduced diameter end section adapted to enter the bore of the mechanism from which the pitman shaft extends to abuttably engage the face of the annular seal;

(e) means for locking said body to said shaft; and, (f) at least one drill guide hole disposed longitudinally between the outer wall and the central bore of said body.

3. An apparatus for use in removing the annular seals surrounding a pitman shaft in a vehicle steering mechanism, the apparatus comprising:

(a) a body including a central bore having two portions;

(b) one portion for threadedly engaging the threaded portion of the pitman shaft;

(c) the second portion of said bore having a larger diameter than said first bore portion, for providing clearance for non-engaged portions of the pitman shaft;

(d) the body including a reduced diameter end section adapted to enter the bore of the steering mechanism from which the pitman shaft extends to minimize relative lateral movement between the apparatus and the steering mechanism; and, (e) a plurality of peripherally spaced drill guide holes disposed longitudinally between the outer wall and the central bore of said body.

4. The apparatus of claim 1 or 3 wherein said reduced diameter end section includes an end surface for abuttably engaging the face of the annular seal when the apparatus is mounted on the mechanism.

* * * * *